Patented Aug. 16, 1932

1,871,730

UNITED STATES PATENT OFFICE

CHARLES L. NORTON, OF BOSTON, MASSACHUSETTS

STRUCTURAL MATERIAL

No Drawing.  Application filed November 17, 1930. Serial No. 496,348.

My invention relates to structural material, particularly to building materials for exterior or interior finish; the principal object is the provision of interior-finish plates, slabs, or tiles combining in their structure a backing or base of stiff, porous and therefore relatively light-weight, fire-proof or at least fire resistant, material, and a hard, dense surface layer or veneer attached and intimately bonded to the backing, non-combustible, dirt-shedding, unaffected by water or ordinary household cleansing chemicals, and resistant to abrasion by scouring powders or soaps.

The preferred permeable backing material is composed of, or comprises in large part, fibrous material, this ensures a tenacious bond between the backing and the surface layer, the latter being prepared and applied as a water-borne concrete mixture of hydraulic cement and a pulverized hard aggregate. Further, in order to produce a good cementitious bond between the backing and the surface layer, there should be incorporated in the backing material, if it does not already comprise it, a substance affinitive to hydraulic cement, such as calcium or magnesium compounds, or a deposit of hydraulic cement from a dilute suspension in water; when fibrous material is incorporated in the backing, it is of advantage to employ fibres which are themselves affinitive to hydraulic cement, for example, asbestos fibres.

In order to produce a surface layer which shall repel dirt, be easily cleansed, and resist abrasion by scouring materials, the substances incorporated with hydraulic cement to form the concrete surface layer must be not only hard, but be reduced to a powder of which the particle sizes are of the same order as that of hydraulic cement, that is, little if any coarser than 100 mesh. Particle sizes less than 300 mesh are to be avoided, particularly if the hard aggregate is inherently quick-setting, and therefore liable, in very high dispersion, to set more quickly than may be consistent with proper control of the process.

The term "hydraulic cement" is herein used to include any cement which will set under water; examples of such cements are, magnesium oxid, oxychlorids of magnesium, zinc, or calcium, calcined or dehydrated gypsum, the lime, silica and alumina mixtures commercially known as Portland cement.

In order to subserve fully the uses for which the herein described structural material is intended, the surface layer must be highly polished in order to resist deposition and retention of dirt, and to be easily cleansed. Therefore, the hydraulic cement ingredient and the associated hard aggregate should be very tenaciously bonded together in a dense, void-free structure, and, during the polishing process at least, the cement must be hardened in order to form, with the hard aggregate, a material uniformly resistant to polishing friction and abrasion.

An example of my invention, in what I believe to be its best embodiment, is afforded by a sheet, slab, or tile of which the backing material is a compressed concrete of asbestos fibres (or the equivalent in crushed serpentine rock) and a hydraulic cement, such as is described in my United States Letters Patent No. 847,293, dated March 12, 1907, and which is now generally known as asbestos wood; and of which the surface layer is a concrete comprising a hydraulic cement and pulverized, hard-burned kaolin. Other hard, pulverized aggregates, such as quartz sand, or flint, will serve the purpose, but these materials do not bond as tenaciously with hydraulic cement as hard-burned kaolin, nor do they set so promptly. The intimacy of bond between cement and kaolin ensures against dislodgment of aggregate particles from the concrete during polishing.

Concrete articles comprising hydraulic cement and a hard aggregate of comminuted or pulverized quartz sand, flint, etc., will be found susceptible of receiving a high polish, but the use of hard-burned kaolin as the sole, or predominant ingredient associated with the cement, because of the quick-setting of such concrete mixture, and also because of the unusually tenacious bond between the cement and kaolin in the final product, makes the product more amenable to polishing abrasion, which does not break the bond and remove aggregate particles as it is liable to do if other hard aggregates are employed.

The remarkable quick-setting property of a concrete mixture comprising hydraulic cement and hard-burned kaolin may be demonstrated as follows. Prepare for comparison mixtures of equal quantities of Portland cement and quartz sand, flint, or any other hard material (other than kaolin grog), and of equal mixtures of Portland cement and hard-burned kaolin (prepared as hereinbelow specified); grind each mixture, dry, in a ball mill until its particles are impalpably fine and practically unsusceptible of further dimensional reduction. In each mixture the cement and hard aggregate will be mutually and evenly distributed, so that every particle of each ingredient will have the same propinquity to particles of the other. Then make a water mixture of each pulverized solid mixture, using the quantity theoretically required for the setting of the cement therein, and cast each in a shallow tray, to equal depths. By the needle test, it will be determined that the cement-kaolin mixture starts its initial set in about two minutes, and is complete in ten minutes, whereas in the other mixture, initial set is detected in from two to two and a half hours and completed in about five hours. If the hard-burned kaolin and cement be reduced to the utmost extremity of fineness by grinding, it will take its initial set in a few seconds.

If porous or permeable materials be used for the backing which do not ordinarily contain substances affinitive to hydraulic cement, they should be impregnated, at the side to which the surface layer is to be applied, with a deposit of such a substance, for instance calcium or magnesium hydraulic cements. For example, a stiff permeable board of vegetable fibres, supplied with a deposit of hydroxid or oxychlorid of magnesium, will bond much more securely with a hydraulic cement concrete applied to its surface, than without such impregnation.

An example of my invention, comprising a backing or base layer of asbestos wood and the hard aggregate concrete surface layer bonded thereto may be made in either of two ways:—By applying the surface layer concrete material to a preformed sheet of asbestos wood, or by overlaying the wet asbestos wood mixture with a surface of water-borne surface layer concrete mixture in a filter press and then proceeding in the manner described in my said patent. Though the former method is slower and more difficult than the latter, in essentials the two are alike; the controlling conditions may be better understood from a description of the slower method, which is as follows:

The sheet of asbestos wood which is to constitute the base of the final product is prepared by soaking in water to full saturation of its permeable body. It will be found advantageous to coat the sheet on one side with a waterproof and water-tight film, as of varnish, before saturating with water. A base-sheet thus prepared will not absorb water from the concrete surface layer mixture applied to the wet unvarnished side, but will invite surface penetration of the surface-layer mixture.

It may be that prevention of abstraction of water from the under side of the cast shape is not so much the immediate desideratum as a precaution against local inhalation of air by the concrete material in the initial setting stage. I have observed that if the conditions of manufacture involve access of air to the under side of the cast shape during the process, the concrete material draws air into itself locally, producing bubbles or voids in its body, that such bubbles occasionally burst through the upper exposed surface, forming craters, and that these voids are of various and sometimes considerable size. Their presence is obviously detrimental and should be guarded against. Retention of saturation by water in a permeable base, or the employment of an impermeable base on which to make the cast, has been accompanied by non-production of bubbles or voids in the concrete body.

Prepare a water-borne concrete mixture, rich in cement, preferably of equal weight-proportions of Portland cement and a kaolin grog made by burning kaolin at a temperature approximating to 3000° F., then pulverizing to a fineness that will all pass a 100 mesh screen. This kind of material and its manufacture, is described in United States Patent No. 1,530,620, dated March 17, 1925, granted to Harter and Kohler. The water proportion need not be closely limited, a fairly free flowing creamy composition is suitable.

The fine particles, both of cement and kaolin, will carry into the water mixture a considerable quantity of adsorbed air, which must be eliminated; otherwise occluded voids will form in the concrete, some of quite considerable size. The air may be effectively removed by subjecting the water mixture to vacuum-exhaust until it ceases to froth.

The surface layer mixture having been thus prepared, flow it over the wet asbestos wood sheet, covering all the surface; tilt the sheet from side to side slightly, and jar it as by tapping the under side sharply, so as to even and level the surface coating.

By reason of the water saturation of the base sheet, excess water is now eliminated from the surface coating by outward evaporation only, and the fluid surface mixture unites with the base sheet, forming ultimately an intimate bond between the base and the surface layer, to which bonding the fibrous component of the base layer doubtless contributes substantially.

The surface of the concrete coating mixture should now be watched, so that the approach to initial setting may be detected. While wet and fluid, the surface layer presents a glassy, highly reflective surface. This, when evaporation has reduced the water-proportion to a critical value, ceases to be highly reflecting and presents a dull, or matte surface. This visible transition marks the approach of initial set. When the concrete mixture has thus ceased to be free-flowing and, being damp and not yet set, is capable of internal flow under pressure, the elimination of water therefrom should be accelerated, and pressure should be applied at or about the same time, in order to compact the damp mixture and eliminate substantially all the voids therein. This may be done by applying a dry bibulous sheet, such as blotting paper, to the surface of the coating layer, and subjecting the layer to roller pressure through the paper. This pressure, in the method being described, need be no heavier than can be applied by a hand-operated roller. Or, a roller jacketed with bibulous material may be applied directly to the damp coating. Or, pressure may be applied by means of a filter-sheet, as of cloth, stretched in a frame, and expressed water removed as it comes through the sheet. Roller pressure on the cloth is recommended, the roller may be of bibulous material, or be followed by any water-removing appliance. If a pervious filter pad, stiff enough to exert pressure on the surface of the concrete layer, be used to compress and compact it, and at the same time exhaust be applied to the upper surface of the pad, the effect of combined pressure and elimination of the last excess water will be satisfactorily produced.

Presently the coating will take its initial set. Thereafter the composite sheet is allowed to remain for six or seven days in a moist atmosphere, to give the concrete surface layer its final set.

When finally set, the concrete surface layer presents a dully reflecting surface which, to render the structural material constituted by the composite sheet suitable in all respects to its uses, should be highly polished. Before polishing, the cement ingredient, which is softer than the hard aggregate, should be hardened; this is done by applying a cement hardening substance, such as a silico-fluoride, which should be applied during the polishing. Carborundum powder and metal polishing discs, or carborundum discs, may be employed to polish the surface layer.

The method which involves simultaneous application of the fine concrete surface layer, and formation of the asbestos wood base, and which is preferable for obvious economical reasons, involves the preparation of the asbestos wood fibre concrete mixture, which is first spread on the filter bed of a hydraulic press, in the manner described in my said patent.

The surface-layer concrete mixture is prepared as for the open-evaporation method above described, except that it is not necessary to submit it to a preliminary exhaustion of occluded air, because the elimination of water by the press-method carries the air out of the mixture and into the base layer or sheet, and thence in large measure at least, out through the filter bed. While the surface layer mixture must be wet enough to flow internally under pressure, it will not be found necessary to use so large a water proportion as in the open evaporation method.

When the two wet mixtures have been thus placed in the press, the press head (which should be slightly oiled to prevent the surface layer mixture from sticking to it) is brought down. If the asbestos wood mixture has been fairly evenly spread in the press, minor irregularities in its surface will do no harm; lateral and internal flow distributes the two layers and produces ultimate tenacious bonding between the two. After a short time (usually not more than thirty seconds) initial setting of the surface layer will have taken place, the press may be opened, and the composite sheet removed, to be placed, with others later superposed with steel sheets between them, in a final setting press, there to remain for six or seven days for final setting.

Hardening and polishing then follows, as with the material made by the open evaporation process.

If a very thin surface layer is to be applied to the asbestos wood base, the asbestos wood mixture is first placed alone in the press, the head brought down and the mixture pressed to an even flat surface by pressure which is much less than that required for the completion of an asbestos wood sheet, and which leaves a fairly large proportion of excess water in the mixture. The press is then opened, and a charge of surface-layer mixture placed on the flattened asbestos wood material. By varying the volume of this surface-layer mixture and also by varying its water content, the thickness of the finally completed surface layer can be adjusted as desired. The operation of the press and subsequent treatment of the composite sheets, will be as above described. Surface coatings of the fine hard concrete as thin as one one-hundredth of an inch have been thus applied to an asbestos wood sheet-base.

While the liability of composite sheets of asbestos wood and concrete veneer, made as above described, to warp is quite small, this contingency may be provided for by applying to the unveneered side of the sheet a concrete coating of composition similar to that of the first coating. If all the conditions requisite to the formation of a completely finished, compacted, and polished concrete surface layer, hereinabove set forth, be observed, the composite, double surfaced sheet will be available in situations when both sides are to be in view. If the second surface layer be only for purposes of prevention of warping, the precautions directed to prevention of bubble-voids, and the final polishing, may be neglected. Compression during initial setting is, however, to be recommended. Such a back-layer may be applied either by the open evaporation, or the closed press method.

The structural material, made by either of the foregoing methods, is quite easily worked with tools, may be sawn and trimmed, or bored to receive fastenings. The natural color of the surface concrete is pleasing; other colors may be produced by mixing pigments with the cement and hard aggregate; concrete mixtures of contrasting colors may be employed to obtain color pattern effects, either regular or irregular. The hard, polished surface of the coating material well adapts it to interior finish and decorative purposes.

In cross section, the composite material structure grades from the porous base, through a very narrow zone wherein the base and surface material bond together, to the dense, compact, and hard surface coating which terminates with its polished and refractory hard surface. The character of the base material adapts the composite sheet to all modes of application to wall, ceiling or floor surfaces, including cementitious attachment or embedment. The character of the surface which will be exposed, is as above described, and renders the material excellent for all structural finish purposes.

In recapitulation, it may be observed, that the watery composition of surface-layer concrete mixture comprises a large proportion of hydraulic cement, and an associated hard aggregate which is of the same order of particle size as the cement, so that practically every particle of either component will be bonded to particles of the other, and the whole surface will be adapted to uniform polishing; that the water proportion is such as to ensure progressive uniform mutual association of the solid components, and to permit sufficient internal flow under pressure to condense the concrete and eliminate voids therefrom; that adsorbed or occluded air is eliminated before the mixture sets initially; that entrance of air is prevented; and that, for the usually indispensable polishing process, the cement ingredient is hardened during, and preferably also before, the polishing operation.

Also, that the base to which the fine concrete surface layer is applied is permeable, preferably fibrous, contains a substance affinitive to hydraulic cement, and is therefore both physically and chemically adapted to enter into close and tenacious bonded relationship with the surface concrete. Also, that a concrete of hydraulic cement and pulverized hard-burned kaolin is, for reasons heretofore stated, superior to other concrete mixtures, and that a base of asbestos wood material is, for reasons stated, a superior material in conjunction with the concrete surface layer mixture.

I claim:

1. In structural material, the combination of a permeable base comprising substance affinitive to hydraulic cement, and a surface layer comprising hydraulic cement and a hard aggregate comminuted to particle size of the same order as that of the associated cement, bonded by said cement to said base.

2. In structural material, the combination of a permeable base comprising substance affinitive to hydraulic cement, and a surface layer comprising hydraulic cement and hard-burned kaolin comminuted to particle size of the same order as that of the associated cement, bonded by said cement to said base.

3. In structural material, the combination of a permeable base comprising substance affinitive to hydraulic cement, and a surface layer comprising a high proportion of hydraulic cement and hard-burned kaolin comminuted to particle size of the same order as that of the associated cement, bonded by said cement to said base.

4. In structural material, the combination of a permeable base comprising substance affinitive to hydraulic cement, and a void-free surface layer comprising a high proportion of hydraulic cement and hard-burned kaolin comminuted to particle size of the same order as that of the associated cement, bonded by said cement to said base.

5. In structural material, the combination of a permeable base comprising substance affinitive to hydraulic cement, and a surface layer comprising hydraulic cement and hard-burned kaolin comminuted to particle size of the same order as that of the associated cement, bonded by said cement to said base, the cement of said layer hardened, and the layer highly polished.

6. In structural material, the combination of a permeable base comprising fibrous material and a substance affinitive to hydraulic cement, and a surface layer comprising hydraulic cement and a hard aggregate comminuted to particle size of the same order as that of the associated cement, bonded by said cement to said base.

7. In structural material, the combination of a permeable base comprising fibrous material and a substance affinitive to hydraulic cement, and a surface layer comprising hydraulic cement and hard-burned kaolin comminuted to particle size of the same order as that of the associated cement, bonded by said cement to said base.

8. In structural material, the combination of a permeable base comprising fibrous material and a substance affinitive to hydraulic cement, and a surface layer comprising a high proportion of hydraulic cement and hard-burned kaolin comminuted to particle size of the same order as that of the associated cement, bonded by said cement to said base.

9. In structural material, the combination of a permeable base comprising fibrous material and a substance affinitive to hydraulic cement, and a void-free surface layer comprising hydraulic cement and hard-burned kaolin comminuted to particle size of the same order as that of the associated cement, bonded by said cement to said base.

10. In structural material, the combination of a permeable base comprising fibrous material and a substance affinitive to hydraulic cement, and a void-free surface layer comprising a high proportion of hydraulic cement and hard-burned kaolin comminuted to particle size of the same order as that of the associated cement, bonded by said cement to said base.

11. In structural material, the combination of a permeable base comprising fibrous material and a substance affinitive to hydraulic cement, and a surface layer comprising a high proportion of hydraulic cement and hard-burned kaolin comminuted to particle size of the same order as that of the associated cement, bonded by said cement to said base, the cement of said layer hardened, and the layer highly polished.

12. In structural material, the combination of a permeable base comprising fibrous material and a substance affinitive to hydraulic cement, and a void-free surface layer comprising hydraulic cement and hard-burned kaolin comminuted to particle size of the same order as that of the associated cement, bonded by said cement to said base, the cement of said layer hardened, and the layer highly polished.

13. In structural material, the combination of a permeable base comprising fibrous material and a substance affinitive to hydraulic cement, and a void-free surface layer comprising a high proportion of hydraulic cement and hard-burned kaolin comminuted to particle size of the same order as that of the associated cement, bonded by said cement to said base, the cement of said layer hardened, and the layer highly polished.

14. In structural material, the combination of a permeable base of concreted asbestos fibres with a hydraulic cement, and a surface layer comprising hydraulic cement and hard-burned kaolin comminuted to particle size of the same order as that of the associated cement, bonded by said cement to said base.

15. In structural material, the combination of a permeable base of concreted asbestos fibres with a hydraulic cement, and a surface layer comprising a high proportion of hydraulic cement and hard-burned kaolin comminuted to particle size of the same order as that of the associated cement, bonded by said cement to said base.

16. In structural material, the combination of a permeable base of concreted asbestos fibres with a hydraulic cement, and a void-free surface layer comprising a high proportion of hydraulic cement and hard-burned kaolin comminuted to particle size of the same order as that of the associated cement, bonded by said cement to said base, the cement of said layer hardened, and the layer highly polished.

Signed by me at Cambridge, Massachusetts this 13th day of November 1930.

CHARLES L. NORTON.